(12) United States Patent
Ando et al.

(10) Patent No.: US 10,763,045 B2
(45) Date of Patent: Sep. 1, 2020

(54) ELECTRONIC DEVICE

(71) Applicant: TDK CORPORATION, Tokyo (JP)

(72) Inventors: Norihisa Ando, Tokyo (JP); Masahiro Mori, Tokyo (JP); Sunao Masuda, Tokyo (JP); Kayou Matsunaga, Yurihonjo (JP); Kosuke Yazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/702,047

(22) Filed: Sep. 12, 2017

(65) Prior Publication Data
US 2018/0075973 A1 Mar. 15, 2018

(30) Foreign Application Priority Data
Sep. 12, 2016 (JP) ................................ 2016-177951

(51) Int. Cl.
*H01G 4/248* (2006.01)
*H01G 4/232* (2006.01)
(Continued)

(52) U.S. Cl.
CPC ................ *H01G 4/38* (2013.01); *H01G 2/06* (2013.01); *H01G 4/224* (2013.01); *H01G 4/232* (2013.01); *H01G 4/248* (2013.01); *H01G 4/30* (2013.01); *H01G 4/008* (2013.01); *H01G 4/012* (2013.01); *H01G 4/12* (2013.01); *H01G 4/1227* (2013.01); *H01G 4/33* (2013.01)

(58) Field of Classification Search
CPC .......... H01G 4/228; H01G 4/232; H01G 4/38; H01G 4/248; H01G 4/30

USPC .... 361/321.1–321.3, 308.1, 310, 309, 306.1, 361/306.3, 301.4, 328
See application file for complete search history.

(56) References Cited

U.S. PATENT DOCUMENTS

| | | | | |
|---|---|---|---|---|
| 6,433,992 B2 * | 8/2002 | Nakagawa | ............... | H01G 4/38 361/301.4 |
| 6,518,632 B1 * | 2/2003 | Yoshida | ................ | H01G 4/228 257/393 |

(Continued)

FOREIGN PATENT DOCUMENTS

| | | |
|---|---|---|
| CN | 103632844 A | 3/2014 |
| JP | H11-251176 A | 9/1999 |

*Primary Examiner* — Arun Ramaswamy
(74) *Attorney, Agent, or Firm* — Oliff PLC

(57) ABSTRACT

An electronic device including: a first chip component, having approximately rectangular parallelepiped shape; a second chip component, having approximately rectangular parallelepiped shape; and an external terminal electrically connected to a first terminal electrode and a second terminal electrode. The external terminal includes an electrode connecting component, connected to the first terminal electrode and the second terminal electrode. The electrode connecting component includes: a first component, connected to the coupling component and faces the first terminal electrode; and a second component, extends upward from the first component and faces the first terminal electrode and the second terminal electrode. Length of the second component in a width direction is shorter than a length of the first component in a width direction. Length W2 of the second component in a width direction is shorter than lengths W3, W4 of the first chip component and the second chip component in a width direction.

11 Claims, 8 Drawing Sheets

(51) Int. Cl.
*H01G 4/38* (2006.01)
*H01G 4/30* (2006.01)
*H01G 2/06* (2006.01)
*H01G 4/224* (2006.01)
*H01G 4/12* (2006.01)
*H01G 4/008* (2006.01)
*H01G 4/012* (2006.01)
*H01G 4/33* (2006.01)

(56) References Cited

U.S. PATENT DOCUMENTS

2001/0001258 A1\* 5/2001 Ishigaki ................ H01G 4/232
 361/502
2014/0055910 A1\* 2/2014 Masuda .................. H01G 4/01
 361/303

\* cited by examiner

ELECTRONIC DEVICE

BACKGROUND OF THE INVENTION

1. Field of the Invention

The present invention relates to an electronic device, to which an external terminal, made by such as a metal terminal, is connected.

2. Description of the Related Art

As the electronic device such as a ceramic capacitor, other than a general chip component directly mounted alone on a surface of a substrate, etc., the external terminal such as the metal terminal attached to the chip component is suggested. It is reported that the external terminal attached electronic device after the mounting has an effect to mitigate the deforming stress the chip component receives from the substrate, or to protect the chip component from the shock or so. Thus, the device is used in a field to require durability, reliability, etc.

A technique, capable to mount a plural number of chip components collectively on the substrate using the external terminal, is also suggested. Attaching the plural number of chip components to the external terminal and making one electronic device realizes an efficient mounting process.

Patent Document 1: JP H11-251176A

DISCLOSURE OF THE INVENTION

Means for Solving the Problems

According to the conventional electronic device using the external terminal, however, there was a problem that a variation in a connecting state between an external terminal and the chip component generates. And thus, there was a case which lowers a manufacturing process yield. In particular, with the electronic device, in which a plural number of the chip components are attached to the external electrode, connecting places between the external terminal and the chip component increase. Therefore, according to the connecting state between each chip component and the external terminal, fluctuations in the mechanical strength and the electric property tend to be large.

The present invention was devised to solve the above problems, and an object of the invention is to provide an electronic device, in which a plural number of chip components are attached to the external electrode, and yet to provide the electronic device, in which the plural number of chip components and the external electrode are connected with a high precision.

In order to solve the above problems, the electronic device of the invention includes:

a first chip component, having an approximately rectangular parallelepiped shape wherein a first terminal electrode is formed at an end face;

a second chip component, having an approximately rectangular parallelepiped shape and stacked on the first chip component, in which a second terminal electrode is formed at an end face; and an external terminal electrically connected to a first terminal electrode and a second terminal electrode, in which the external terminal includes: an electrode connecting component, connected to the first terminal electrode and the second terminal electrode; a coupling component, projected to the lower side from the electrode connecting component; and a connecting component for mounting, connected to a lower end of the coupling component and extends in a direction approximately vertical to the coupling component, the electrode connecting component includes: a first component, connected to the coupling component and faces the first terminal electrode; and a second component, extends upward from the first component and faces the first terminal electrode and the second terminal electrode, a length of a width according to the second component, in a direction parallel to the end face and a lower face of the first chip component, is shorter than the same according to the first component, and a length $W2$ of the width according to the second component is shorter than lengths $W3$, $W4$ of the width according to the first chip component and the second chip component.

According to the electronic device of the invention, the second component of the electrode connecting component is disposed to straddle the first terminal electrode and the second terminal electrode. A length of the second component in a width direction is shorter than the same of the first chip component and the second chip component. Thus, according to the electronic device of the present invention, the second component is connected to the first terminal electrode and the second terminal electrode near the boundary between the first terminal electrode and the second terminal electrode. Thus, the external terminal and the plural number of the chip components are capable to be accurately and precisely connected.

In addition, a bridge of the connecting member, such as a solder, between the second component and the first and the second terminal electrodes is likely to be formed, and that the connecting member is capable to provide a good mechanical strength. According to such electronic device, the connecting member can be applied after the chip component and the external terminal electrode is assembled, making production thereof easy. In addition, the connecting part state can be easily and visually recognized from outer part. Thus, detection of defective products due to the connecting state is easy. Further, a length of the second component in a width direction is shorter than the same of the first component. Therefore, the connecting member, such as a solder, flowing downward and overly spreading when molten can be properly prevented by the wide first component which receives the connecting member. Therefore, such electronic device properly ensures the mechanical strength of the connecting part.

In addition, for instance, the length $W1$ of the first component in a width direction may be longer than the length of the first chip component in a width direction.

The length of the first component in a width direction is longer than the same of the first chip component. Thus, a shock applied directly to the first chip component from outer side, such as at the time of conveyance of the electronic device, can be prevented.

An upper end of the second component may be at lower place than the same of the second terminal electrode.

Such configuration can make the size of the second component and the same of an entire external terminal small, suppressing a cost of the electronic device. Further, by suppressing a contact area between the second component and the second terminal electrode, transmission of a vibration from the second chip component to the external terminal can be prevented, and the occurrence of noise can also be prevented.

For instance, a ratio W1/W3 of the length W1 of the first component in a width direction and the length W3 of the first chip component in a width direction may be 0.85 to 1.15.

By making the value of W1/W3 equal to or more than a predetermined value, a connecting strength between the electrode connecting component and the first and the second terminal electrodes can be ensured. By making the value of W1/W3 equal to or less than a predetermined value, the occurrence of noise can be prevented.

For instance, a ratio T5/T3 of a vertical length T5 from the upper end of the first component to the same of the first terminal electrode and a vertical length T3 of the first chip component may be 0.10 to 0.60.

By making T5/T3 equal to or more than the predetermined value, an area where the first terminal electrode is exposed from the electrode connecting component can be ensured, and the connecting strength between the first terminal electrode and the electrode connecting component can be enhanced. While, by making T5/T3 equal to or less than the predetermined value, overly spread of the connecting member, connecting the first and the second terminal electrodes and the electrode connecting component, when molten can be prevented, and fluctuations of the connecting strength of the connecting member can be prevented.

For instance, according to the coupling component, a solder adhesion prevented area, poor in wettability of the solder relative to the outer face of the coupling component facing the opposite side of the inner face of the coupling component, may be formed on said inner face of the coupling component facing the first chip component.

By forming the solder adhesion prevented area on the inner face of the coupling component, creeping up of the solder used for the mounting along the coupling component and connecting the first chip component and the mounting face, when mounting the electronic device such as on substrate, are prevented. And the occurrence of noise is suppressed.

For instance, the electronic device may include a support component, connected to a lower end of the electrode connecting component, extends approximately vertical to the electrode connecting component toward the first chip component side, and supports the first chip component from the underside.

The support component supports the first chip component. Thus, a positioning of the first chip component and the external terminal when manufacturing becomes easy. And in such as a jointing process, a slipping of the first chip component to a position facing the coupling component or lower can be prevented. Further, a lower gap of the first chip component can be reliably ensured.

A length, from an end of the support component to the electrode connecting component, is longer than the same of a curvature radius of "R" shape formed on a corner of the first chip component.

R-shape of the first chip component is likely to generate fluctuations due to the manufacturing process. Further, in case when the support component contacts the R-shape part, the positional relation between the first chip component and the external terminal is likely to be displaced. By lengthening the support component, however, a flat plane part at the bottom face of the first chip component can be stably supported.

For instance, the length in the width direction of the second component is varied according to a position of the second component in a height direction; and said length in the width direction at the center part of the second component in the height direction may be shorter than the same at the upper end and the lower end of the second component in the height direction.

A length of a side at a side of the second component is lengthened by forming the second component having such shape. Thus, the connecting strength between the electrode connecting component and the first and the second chip components is enhanced. Further, the connecting material, such as the solder, is likely to stay near the center part of the second component in a height direction. Thus, fluctuations in a spreading method of the connecting material can be prevented, and fluctuations of the connecting strength due to the connecting member can be suppressed.

DESCRIPTION OF THE PREFERRED EMBODIMENTS

Hereinafter, the present invention will be described based on the embodiments shown in figures.

The First Embodiment

Figure 1:
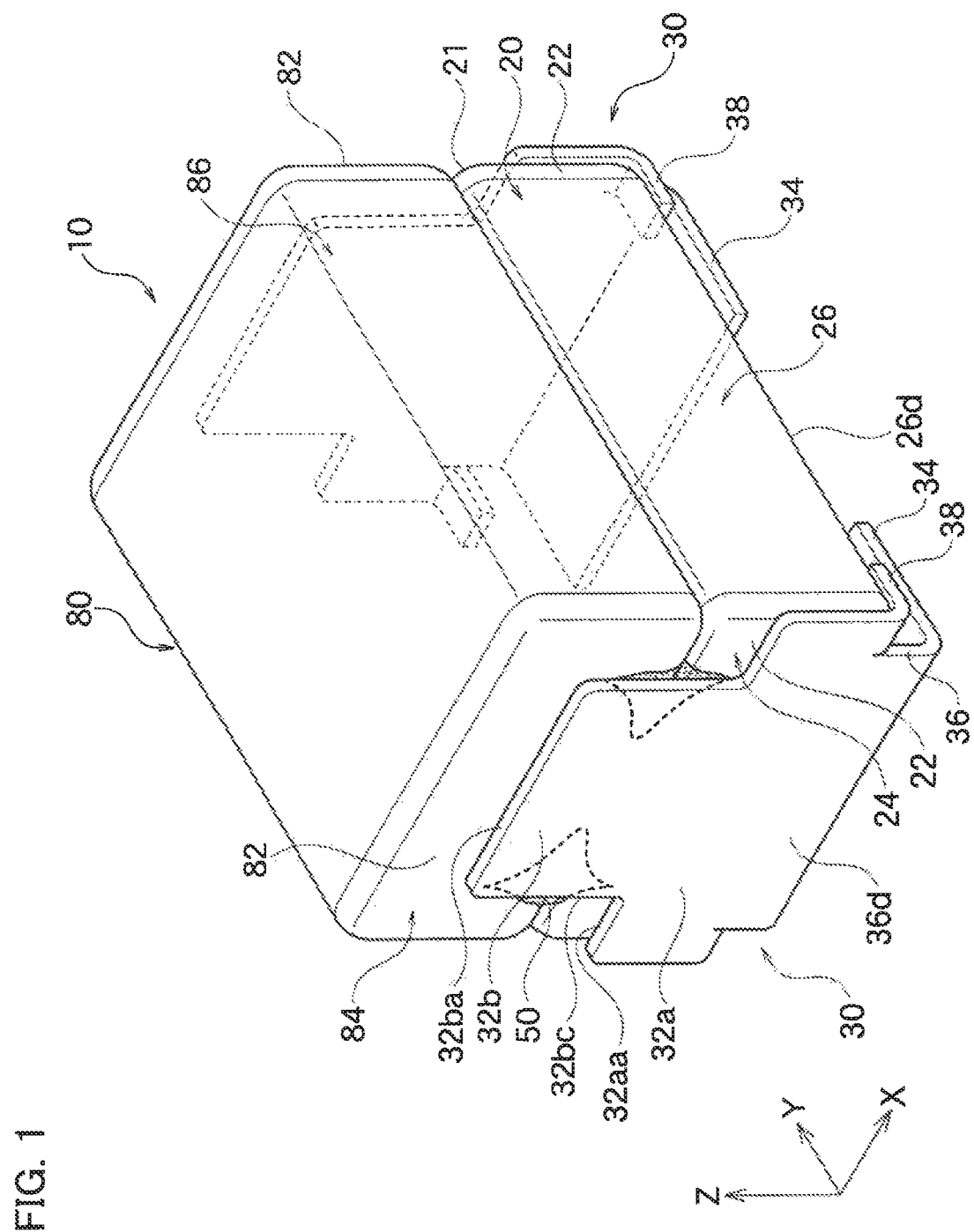
FIG. 1 is a perspective view of an electronic device of an embodiment of the invention.

FIG. 1 is the perspective view showing ceramic capacitor 10 as the electronic device according to the first embodiment of the invention. Ceramic capacitor 10 includes the first chip capacitor 20 as the first chip component, the second chip capacitor 80 as the second chip component, and metal terminal 30 as a pair of external terminal, respectively attached to both end faces of the first and the second chip capacitors 20, 80.

Note, in the description of each embodiment, the explanation will be performed based on ceramic capacitor 10, in which a pair of metal terminals 30 are attached to the first and the second chip capacitors 20, 80, respectively. The electronic device according to the invention is not limited thereto, and metal terminal 30 may be attached to the chip component other than the capacitor.

The first chip capacitor 20 and the second chip capacitor 80 have approximately the same size, and each has an approximately rectangular parallelepipedic outer shape. The first chip capacitor 20 and the second chip capacitor 80 are arranged in parallel, and the second chip capacitor 80 is stacked on the first chip capacitor 20.

According to an embodiment of the invention, among faces of the approximately rectangular parallelepipedic first and second chip capacitors 20, 80, it is described that the two opposite faces not including the longest side in the rectangular parallelepiped as end faces 24, 82, respectively, and four faces connected to the two end faces 24, 84 as side faces 26, 86. Note, in the other first and second chip capacitors, two opposite faces including the shortest side and the longest side may become the end face.

The first terminal electrode 22 is formed on both end faces 24 of the first chip capacitor 20, and the first chip capacitor 20 includes a pair of the first terminal electrode 22. The first terminal electrode 22 is formed on the entire end face 24 of the first chip capacitor 20, and extended to a part of side face 26 connected to the end face 24. Note, said two first terminal electrodes 22 are not connected and mutually electrically insulated.

The two end faces 24 of the first chip capacitor 20 are arranged parallel to ZX plane. Among the four side faces 26 of the first chip capacitor 20, a downward (Z-axis negative direction) directed lower side face 26d and an upward (Z-axis positive direction) directed upper side face 26b are arranged parallel to XY plane. In addition, among the four side faces 26 of the first chip capacitor 20, front side face 26a facing the front direction (X-axis positive direction) and rear side face facing the rear side direction (X-axis negative direction) are arranged parallel to YZ plane.

Similarly with the first chip capacitor 20, in the second chip capacitor 80, the second terminal electrode 82 is formed on both end faces 84, and the second chip capacitor 80 includes a pair of the second terminal electrode 82. Formation and position of the second terminal electrode 82 in the second chip capacitor 80 is similar with the first terminal electrode 22 in the first chip capacitor 20. In addition, the positions of the end face 84 and side face 86 in the second chip capacitor 80 are similar with the same in the first chip capacitor 20.

One end face 84 of the second chip capacitor 80 is arranged approximately on the same plane as one end face 24 of the first chip capacitor 20. The other end face 84 of the second chip capacitor 80 is arranged approximately on the same plane as the other end face 24 of the first chip capacitor 20. Upper side face 26b (See FIG. 2) of the first chip capacitor 20 faces the lower side face of the second chip capacitor 80. In the present embodiment, upper side face 26b of the first chip capacitor contacts the lower side face of the second chip capacitor 80. Note, the arrangement of the first chip capacitor 20 and the second chip capacitor 80 is not limited thereto; a predetermined gap can be formed between the first chip capacitor 20 and the second chip capacitor 80.

Note, X, Y and Z axes are mutually vertical in each figures. Z axis is a vertical direction to the mounting face where ceramic capacitor 10 is mounted; Y axis is a vertical direction to the end faces 24, 84 of the first and the second ceramic capacitors 20, 80; and X axis is a vertical direction to a front side face 26a and a rear side face.

The first and the second chip capacitors 20, 80 include capacitor element, and the capacitor element includes, as a ceramic layer, a dielectric layer and an internal electrode layer. Inside the capacitor element, the dielectric layer and the internal electrode are alternately laminated. A material of the dielectric layer is not particularly limited, and for instance, it may be composed by dielectric materials of calcium titanate, strontium titanate, barium titanate, a mixture thereof, and etc. The thickness of each dielectric layer is not particularly limited, however, it is generally a few μm to few hundreds of μm.

A conductive material included in the internal electrode is not particularly limited; however, in case when the material composing the dielectric layer shows reduction to reducibility, relatively inexpensive base metals can be used. The base metal is preferably Ni or Ni alloys. The Ni alloy is preferably an alloy of Ni and one or more kinds of element selected from Mn, Cr, Co and Al. Ni content in the alloy is preferably 95 wt % or more. Note, in said Ni or Ni alloy, various kinds of trace components such as "P" may be preferably included for approximately 0.1 wt % or less. In addition, the internal electrode layer can be formed using a commercially available electrode paste. A thickness of the internal electrode can be suitably determined according to its use.

Materials of the first terminal electrode 22, formed on both end faces 24 of the first chip capacitor 20, and the same of the second terminal electrode 82, formed on both end faces 84 of the second chip capacitor 80, are not particularly limited; and copper, copper alloys, Nickel, Nickel alloys, and etc. can be used. Silver, an alloy of silver and palladium, and etc. can also be used. The thickness of the first and the second terminal electrodes 22, 82 is not particularly limited; and it is generally around 10 to 50 μm. Note, a metal coat of at least one kind selected from Ni, Cu, Sn, and etc. can be formed on the surface of the first and the second terminal electrodes 22, 82. In particular, it is preferable to make the following: a Cu fired layer/a Ni plating layer/a Sn plating layer.

According to the present embodiment, the first and the second terminal electrodes 22, 82 are configured by a multilayered electrode film at least including a resin electrode layer. The occurrence of noise in the chip capacitor can be effectively suppressed by the resin electrode layer, which absorbs the vibration. In case when the first and the second terminal electrodes 22, 82 include the resin electrode layer, the first and the second terminal electrodes 22, 82 are preferably composed of a plural number of layers, which may be preferably a fired layer/a resin electrode layer/a Ni plating layer/a Sn plating layer from the contacting side of the capacitor element.

Figure 2:
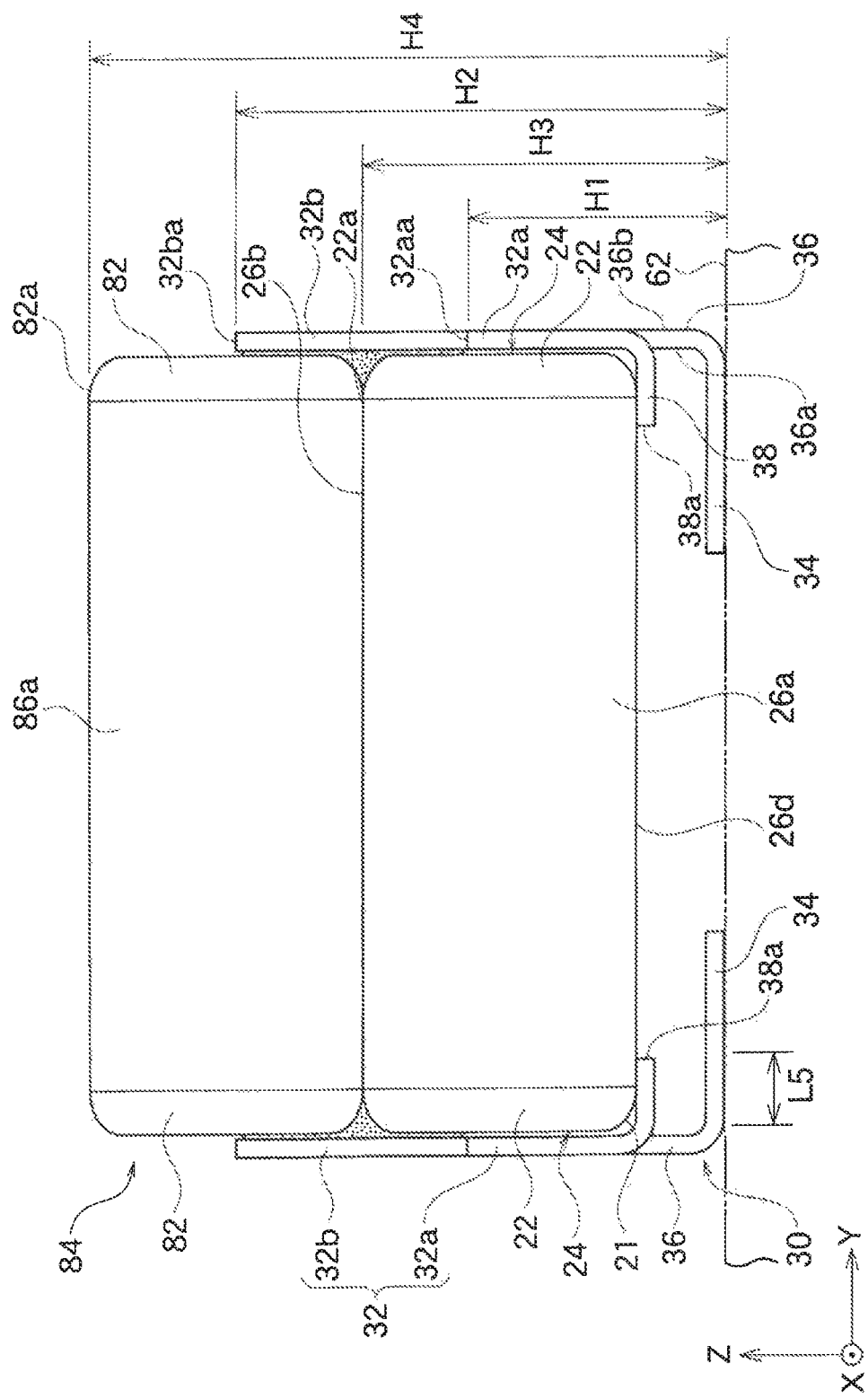
FIG. 2 is a front view of the electronic device shown in FIG. 1.

The first and the second terminal electrodes 22, 82, as shown in FIG. 2, are formed on both end faces 24, 84 of the first and the second chip capacitors 20, 80, and partly on side faces 26, 86 near the end faces. Note, it is not particularly limited that to what extent the first and the second terminal electrodes 22, 82 are formed on side faces 26, 86 of the first and the second chip capacitors 20, 80. The first and the second terminal electrodes 22, 82 may not be substantially formed on side faces 26, 86.

In case when the first terminal electrode 22 is formed on side face 26 of the first chip capacitor 20, an end part 38a of the support component, which is the end of support component 38 in metal terminal 30 shown in FIG. 2, is preferable not to contact the first terminal electrode 22. In particular, by making an area of the first terminal electrode 22, formed on lower side face 26d of the first chip capacitor 20, small, the formation of the solder bridge between the first terminal electrode 22 and connecting component for mounting 34 can be effectively prevented.

As shown in FIGS. 1 and 2, two metal terminals 30 included in ceramic capacitor 10 are attached to both end faces 24, 84 of the first and the second chip capacitors 20, 80 in Y axis direction, respectively. One metal terminal 30 in Y axis positive direction is electrically connected to one first terminal electrode 22 of the first chip capacitor 20 and one second terminal electrode 82 of the second chip capacitor 80. The other metal terminal 30 in Y axis negative direction is electrically connected to the other first terminal electrode 22 of the first chip capacitor 20 and the other second terminal electrode 82 of the second chip capacitor 80.

The two metal terminal 30 included in ceramic capacitor 10 according to the present embodiment, are approximately symmetrically attached to the first and the second chip capacitors 20, 80. Said two metal terminal 30 have the same formation. Outer form of the first and the second chip capacitors 20, 80 are also approximately symmetrical. Note, formations of the two metal terminals 30 may be different.

Metal terminal 30 includes: electrode connecting component 32, connected to the first terminal electrode 22 and the second terminal electrode 82; coupling component 36, projected to the lower side from electrode connecting component 32; and connecting component for mounting 34, connecting a lower end of coupling component 36 and extending in a direction approximately vertical to coupling component 36. In addition, metal terminal 30 connects the lower end of electrode connecting component 32, extends to a direction approximately vertical to the electrode connecting component to the first chip component side, and includes support component 38, supporting the first chip capacitor 20 from the underside.

Figure 5:
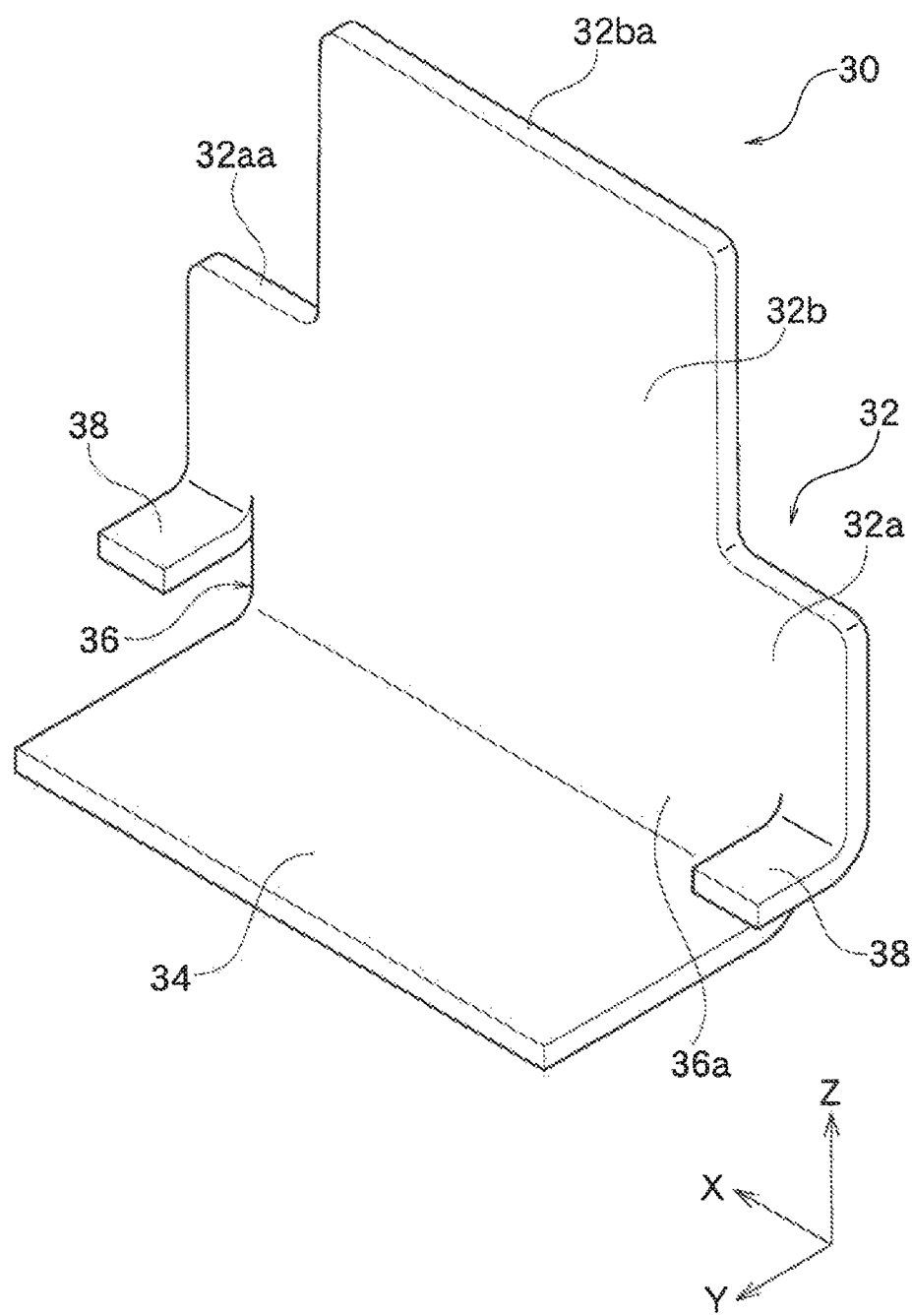
FIG. 5 is a perspective view of the external terminal shown in FIG. 1.

As shown in FIG. 5, electrode connecting component 32 and coupling component 36 in metal terminal 30 are flat parts parallel to the XZ plane, parallel to end faces 24, 84 of the first and the second chip capacitors 20, 80. Note, a through hole or unevenness can be formed on electrode connecting component 32 and coupling component 36.

As shown in FIGS. 1 and 2, electrode connecting component 32 faces end faces 24, 84 of the first and the second chip capacitors 20, 80. As mentioned, the first and the second terminal electrodes 22, 82 are formed on end faces 24, 84 of the first and the second chip capacitors 20, 80. Thus, electrode connecting component 32 faces the first and the second terminal electrodes 22, 82.

Figure 3:
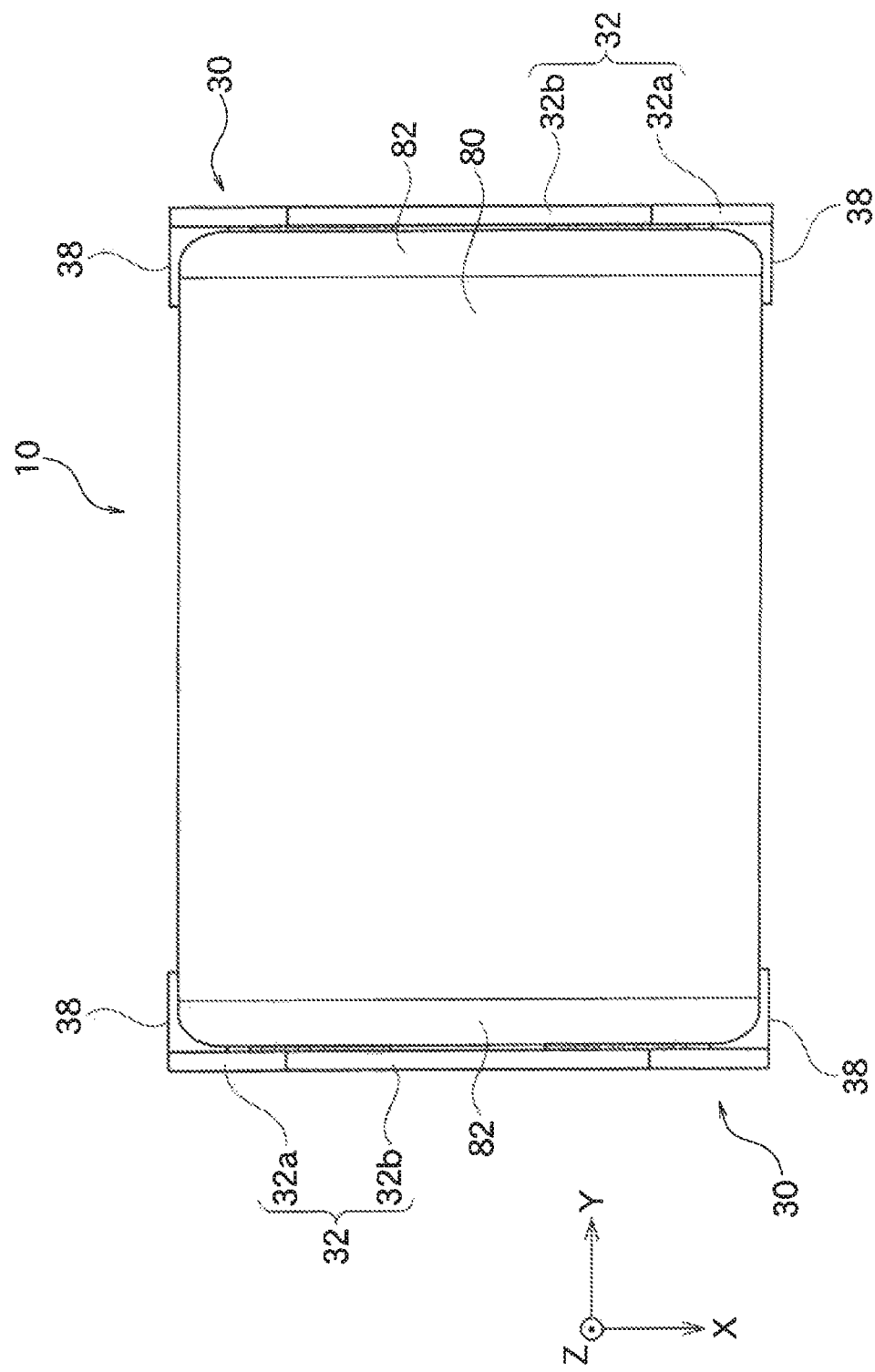
FIG. 3 is a plane view of the electronic device shown in FIG. 1.
Figure 4:
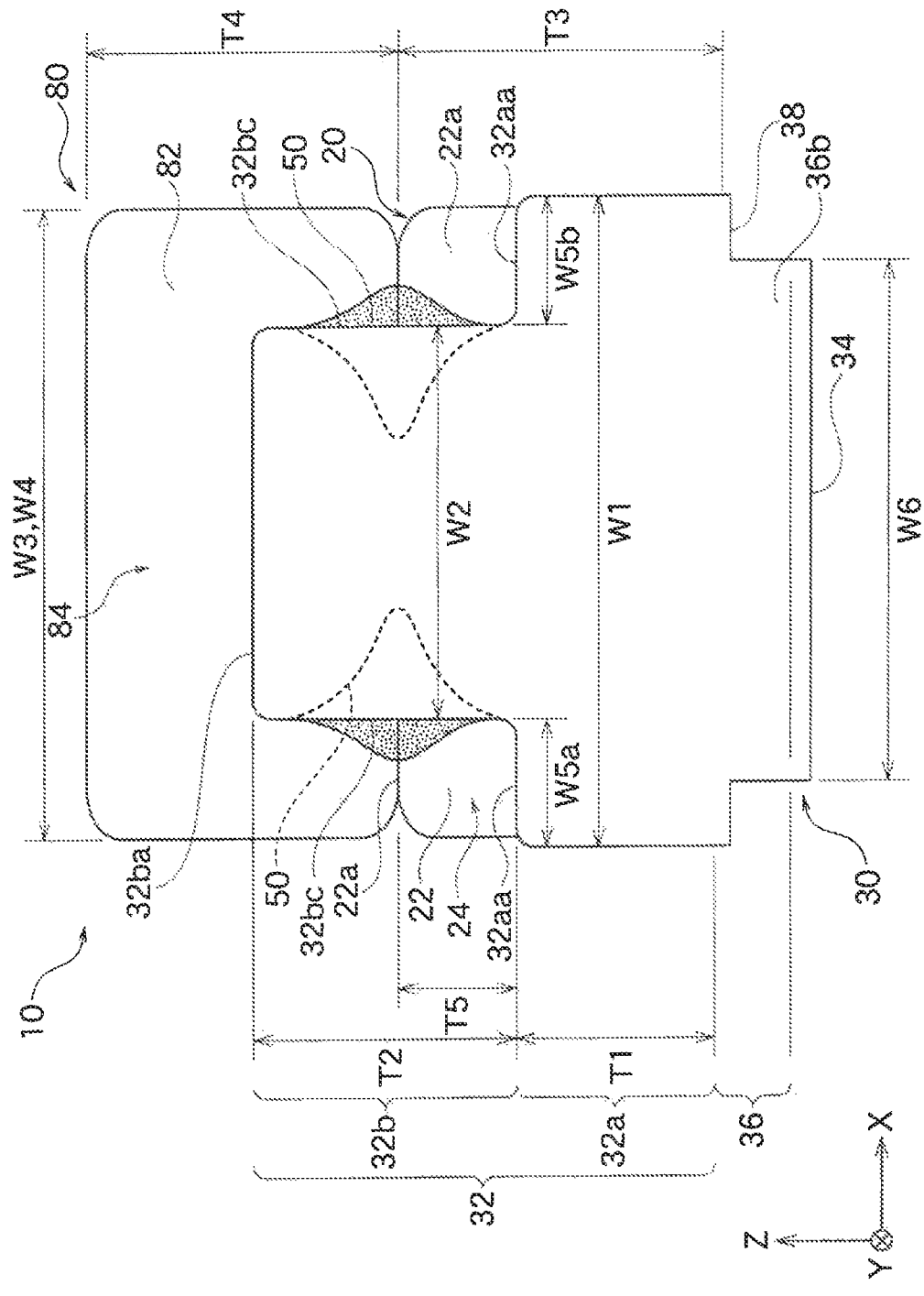
FIG. 4 is a side view of the electronic device shown in FIG. 1.

As shown in FIGS. 1 and 4, electrode connecting component 32 connects to coupling component 36 at the lower side and includes the first component 32a, facing the first terminal electrode 22, and the second component 32b, extending upward from the first component 32a and facing both the first terminal electrode 22 and the second terminal electrode 82. In case when a direction parallel to end face 24 and lower side face 26d of the first chip capacitor 20, X-axis direction in FIGS. 1 to 5, is determined a width direction, length W2 of the second component 32b in a width direction is shorter than length W1 of the first component 32a in a width direction, as shown in FIG. 4. Further, as shown in FIG. 4, the second component 32b is projected to the upper side from the center part of the first component 32a. Thus, electrode connecting component 32 has an upside down T-shape when seen from Y-axis direction.

Note, in the first chip capacitor 20, end face 24 is parallel to XZ plane and lower side face 26d is parallel to XY plane. Thus, a width direction parallel to end face 24 and lower side face 26d is X axis direction. In addition, as shown in FIG. 2, in case when ceramic capacitor 10 is mounted on a flat mounting face 62, a width direction of the first component 32a and the second component 32b corresponds to a direction parallel to mounting face 62 (XY plane) and a direction (X axis direction) vertical to the thickness direction (Y axis direction) of electrode connecting component 32.

Note, in the description of the length (size) of ceramic capacitor 10, a direction (X axis direction) parallel to end face 24 and lower side face 26d of the first chip capacitor 20 is made a width direction, a direction (Z axis direction) vertical to lower side face 26d of the first chip capacitor 20 is made a vertical (up and down) direction, and a direction (Y axis direction) vertical to end face 24 of the first chip capacitor 20 is made an opposing direction. Further, a height of ceramic capacitor 10 defines a distance from the bottom face (a place equal to mounting face 62 shown in FIG. 2) of connecting component for mounting 34, and is equal to a vertical length from the lower end of connecting component for mounting 34 to a predetermined part. Further, according to the description of ceramic capacitor 10, a direction (Z axis negative direction) headed to mounting face 62 is made a downward direction, and a direction (Z axis positive direction) headed to the opposite side of mounting face 62 is made an upward direction.

As shown in FIG. 4, length W2 of the second component 32b in a width direction is shorter than length W3 of the first chip capacitor 20 in a width direction and length W4 of the second chip component in a width direction. Thus, seen from Y axial direction, end face 24 of the first chip capacitor 20 and end face 84 of the second chip capacitor 80 are exposed from both side of the second component 32b. Note, according to the present embodiment, length W3 of the first chip capacitor 20 in a width direction and length W4 of the second chip component in a width direction are the same.

As shown in FIGS. 1 and 4, electrode connecting component 32 of metal terminal 30 is connected to the first and the second terminal electrodes 22, 82 of the first and the second chip capacitors 20, 80 by conductive connecting member 50. Connecting member 50, connecting electrode connecting component 32 and the first and the second terminal electrodes 22, 82, is not particularly limited; however, solder, conductive adhesive agent, and etc. are exemplified.

Connecting member 50 is provided in the periphery of side 32bc, particularly along side 32bc, corresponding to an edge part of the width direction according to the second component 32b. As shown in FIG. 4, side 32bc of the second component 32b is disposed to straddle the first terminal electrode 22 and the second terminal electrode 82. Therefore, by setting connecting member 50 along side 32bc, electrode connecting component 32 can be reliably connected to both the first chip capacitor 20 and the second chip capacitor 80. In addition, when connecting member 50 forms bridge between side 32bc and the first and the second terminal electrodes 22, 28, a connecting reliability between electrode connecting component 32 and the first and the second chip capacitors 20, 80 can be enhanced.

As shown in FIGS. 2 and 4, according to the first and the second chip capacitors 20, 80, R-shape 21, 81 are formed on a corner side (ridgeline part), where two adjacent end faces 24, 84 and side face 26 are connected. Thus, when a manufacturing process, in which connecting member 50 is applied after the first and the second chip capacitors 20, 80 and the metal terminal 30 are arranged (positioned), is adopted, connecting member 50 flows in a gap between the first and the second terminal electrodes 22, 82 and the second component 32b along R-shape 21, 81 where side 32bc crosses. And electrode connecting component 32 and the first and the second chip capacitors 20, 80 can be reliably connected.

As shown in FIG. 4, length W1 of the first component 32a in a width direction is longer than length W2 of the second component 32b in a width direction. Thus, the first component upper end 32aa, the upper end of the first component 32a, can prevent connecting member 50 to overly spread downward by gravity. Namely, the first component upper end 32aa can block connecting member 50, when fluidity increases such as by the heat processing during manufacturing and flows downward due to its weight. Thus, ceramic capacitor 10 can suppress fluctuations of the position and the range where connecting member 50 is set, and fluctuations of the mechanical strength and electrical characteristic due to fluctuations of the connecting state can be made small.

It is not particularly limited as long as length W1 of the first component 32a in a width direction is longer than length W2 of the second component 32b in a width direction; however, for instance, W2/W1 is preferably 0.50 to 0.85. Length W1 of the first component 32a in a width direction may be longer or shorter than lengths W3, W4 of the first and the second chip capacitors 20, 80 in a width direction. By making length W1 of the first component 32a in a width direction longer than lengths W3, W4 of the first and the second chip capacitors 20, 80 in a width direction, the first chip capacitor 20 can be suitably protected from such as a shock from outer side. Further, by making length W1 of the first component 32a in a width direction shorter than lengths W3, W4 of the first and the second chip capacitors 20, 80 in a width direction, ceramic capacitor 10 contributes to downsizing. W1/W3 can be, for instance, 0.85 to 1.15.

As shown in FIG. 4, length W5a of the first component upper end 32aa in a width direction formed on one side (X-axis negative direction) of the second component 32b in a width direction (X-axis direction) is preferably the same with length W5b of the first component upper end 32aa in a width direction formed on the other side (X-axis positive direction) of the second component 32b in a width direction (X-axis direction). W5a/W1, W5b/W1 are preferably 0.07 to 0.30.

Vertical length T1 of the first component 32a is not particularly limited; however, it is preferably shorter than vertical length T3 of the first chip capacitor 20. Vertical length T2 of the second component 32b is also not particularly limited; however, it is preferably shorter than T3+T4, a sum of vertical length T3 of the first chip capacitor 20 and vertical length T4 of the second chip capacitor 80. In view of ensuring the opposite area of the second chip component and the electrode connecting part, T2/T4 can be 0.5 to 2.4. In addition, T2/T1 can be, for instance, 1.0 to 5.0.

As shown in FIG. 4, a ratio T5/T3 of vertical length T5 from the first component upper end 32aa, which is an upper end of the first component 32a, to the first terminal electrode upper end 22a, which is an upper end of the first terminal electrode 22, and vertical length T3 of the first chip capacitor 20 is preferably 0.10 to 0.60. An area of the first terminal electrode 22 exposed from electrode connecting component 32 is ensured, and the connecting strength of the first terminal electrode 33 and electrode connecting component 43 can be enhanced, by setting T5/T3 equal to or more than a predetermined value. In addition, by setting T5/T3 equal to or less than a predetermined value, connecting member 50, connecting the first terminal electrode 22 and the second terminal electrode 82 with electrode connecting component 32, can be prevented to overly spread when molten. Thus, fluctuations of the connecting strength due to connecting member 50 can be suppressed.

Coupling component 36 is connected to lower part of electrode connecting component 32, and arranged in the same plane with electrode connecting component 32. As shown in FIG. 2, coupling component 36 is not opposed to end faces 24, 84 of the first and the second chip capacitors 20, 80, unlike electrode connecting component 32. Thus, lower side face 26d of the first chip capacitor 20 is upwardly separated from connecting component for mounting 34 by a vertical length of coupling component 36.

according to coupling component 38, the solder adhesion prevented area, poor in wettability of the solder relative to the outer face 36b of the coupling component facing the opposite side of the inner face 36a of the coupling component 36, may be formed on said inner face 36a of the coupling component facing the first chip component 20. By forming the solder adhesion prevented area on inner face 36a of the coupling component, the solder used for mounting ceramic capacitor 10 is prevented to reach the first chip capacitor 20, and prevent the occurrence of noise.

As shown in FIG. 4, length W6 of coupling component 36 in a width direction is preferably shorter than length W1 of the first component 32a in a width direction. Length W6 of coupling component 36 in a width direction is preferably longer than length W2 of the second component 32b in a width direction. By setting W2<W6<W1, coupling component 36 prevents the transmission of the vibration and prevents the occurrence of noise, and a proper strength supporting the first and the second chip capacitors 20, 80 can be provided to coupling component 36. It is considered that the occurrence of noise is generated when a high frequency voltage is applied to the ceramic layer, composing most part of the first and the second chip components, the ceramic layer vibrates due to an electrostrictive effect, and said vibration is transmitted to metal terminal 30 and/or mounting substrate.

As shown in FIG. 2, connecting component for mounting 34 connects the lower end of coupling component 36, bents in a direction approximately vertical to coupling component 36 from the lower end of coupling component 36, and extends at a lower part of the first chip capacitor 20. Note, the connecting component for mounting may bent in a direction opposite to the first chip capacitor 20 from coupling component 36. The connecting component for mounting according to such modified example also extends in a direction (XY plane direction) approximately vertical to coupling component 36. Connecting component for mounting 34 is opposed to 5 a land on substrate when mounting ceramic capacitor 10 on such as substrate, and connected to the land of substrate by the connecting member such as solder.

As shown in FIG. 2, support component 38 connects the lower end of electrode connecting component 32, bents in a direction approximately vertical to electrode connecting component 32 from the lower end of electrode connecting component 32, and extends downward of the first chip capacitor 20. As shown in FIGS. 3 and 4, one metal terminal 30 includes two support components 38, and support components 38 are disposed on both sides of coupling component 36 in a width direction (X-axial direction). According to the present embodiment, as shown in FIGS. 5 and 3, connecting component for mounting 34 and support component 38 do not overlap when seen from a vertical direction (Z-axis direction) of the mounting face. Connecting component for mounting 34 and support component 38 are constituted so as not to overlap each other when seen from Z-axis direction, thus, an extension of solder, connecting component for mounting 34 and mounting substrate shown in FIG. 2, toward support component 38 can be effectively prevented. And so-called solder bridge phenomenon can be suppressed.

Support component 38 is not particularly limited as long as it can support the first chip capacitor 20 from the lower part; however, as shown in FIG. 2, a length L5 in opposing direction (Y-axis direction), from support component end part 38a, which is the end of support component 38, to an inner side face of electrode connecting component 32, is longer than the radius of curvature "R" of R-shape 21 formed on the side (particularly the corner side connecting end face 24 and lower side face 26d) of the first chip capacitor 20. By making the length of support component 38 to such length, support component 38 stably supports the flat plane of lower side face 26d of the first chip capacitor 20.

As shown in FIG. 2, the second component upper end 32ba, which is the upper end of the second component 32b, may be arranged at a place lower than the second terminal electrode upper end 82a, which is the upper end of the second terminal electrode 82. Namely, height H2 of the second component upper end 32ba is lower than height H4 of the second terminal electrode upper end 82a. Thus, the height of ceramic capacitor 10 can be suppressed and ceramic capacitor 10 can be miniaturized, while suppressing cost. H2/H4 can be for instance, 0.54 to 0.97.

The first component upper end 32aa, which is the upper end of the first component 32a, is arranged at a place lower than the first terminal electrode upper end 22a, which is the upper end of the first terminal electrode 22. In other word, height H1 of the first component upper end 32aa is arranged at a place lower than height H3 of the first terminal electrode upper end 22a. Fluctuations of the connecting strength by connecting member 50 can be suppressed by satisfying the relation H1<H3<H2.

A size of the first and the second chip capacitors 20, 80 can be suitably determined according to its object and use. The size of the first and the second chip capacitors 20, 80 is, for instance, a vertical length of 0.6 to 5.6 mm×a horizontal length of 0.3 to 5.0 mm×a thickness of 0.1 to 5.6 mm. The size of the first chip capacitor 20 and the same of the second chip capacitor 80 may be the same or different.

Manufacturing Method of Ceramic Capacitor 10

Manufacturing method of ceramic capacitor 10 is described hereinafter. At first, the first and the second chip capacitors 20, 80 are prepared when manufacturing ceramic capacitor 10. When manufacturing the first and the second chip capacitors 20, 80, a green sheet, which becomes a dielectric layer after firing, is formed on a carrier sheet, and then an electrode pattern, which becomes an internal electrode layer after firing, is formed on a surface of the green sheet. After forming the electrode pattern on the green sheet, dried thereof, and an electrode pattern formed green sheet is obtained.

According to the present embodiment, a coating for the green sheet which becomes a raw material of the green sheet is composed of an organic solvent based paste, obtained by kneading a raw material of dielectric material and organic vehicle, or a water based paste. The raw material of the dielectric material is suitably selected from various compounds which become calcium titanate, strontium titanate or barium titanate after firing, such as carbonates, nitrates, hydro oxides, the organic metal compounds, and etc. Conductive material used for manufacturing a coating for the internal electrode layer is preferably Ni, Ni alloys, or the mixture thereof.

Next, a green sheet on which the internal electrode pattern is removed from a carrier sheet, laminated thereof to a desired number of lamination, green sheets for external layers on which the internal electrode pattern is not formed are laminated in a beginning and an end of the lamination, and the green laminated body is obtained. Further, the final pressure is applied to the green laminated body, polished thereof when necessary, and binder removal treatment and firing of the green chip are performed. Temperature condition of the binder removal treatment and the firing is not particularly limited. A capacitor element is obtained by anneal treatment, polish, and etc., after firing when necessary.

Subsequently, the first and the second chip capacitors 20, 80 are obtained by forming the first and the second terminal electrodes 22, 82 on the capacitor element. The first and the second terminal electrodes 22, 82 are manufactured by forming a base electrode by such as firing the coating for terminal electrode, and then forming a metal coat by plating on a surface of the base electrode. Note, the coating for terminal electrode can be prepared similar to the coating for the internal electrode layer mentioned above.

In case of forming the first and the second terminal electrodes 22, 82 including a resin electrode layer, a base electrode made by a fired layer is formed at the end face of element body, and then the resin electrode layer is formed after applying a resin electrode paste film. Subsequently, Ni plating layer and Sn plating layer can be formed.

For manufacturing ceramic capacitor 10, metal terminal 30 is then prepared. A flat metal plate is firstly prepared for manufacturing metal terminal 30. A material of the metal plate is not particularly limited as long as it is a metal material having conductivity, and for instance, iron, nickel, copper, silver, and an alloy including thereof can be used. A thickness of metal terminal 30 is not particularly limited, and it is preferably 0.05 to 0.10 mm.

Next, metal terminal 30 shown in FIG. 5 is obtained by mechanical processing the metal plate. Concrete processing method is not particularly limited; however, pressing is preferably used. Metal coat is formed by plating on the surface of metal terminal 30. Material used for plating is not particularly limited, and for instance, Ni, Sn, Cu, and etc. are exemplified.

Further, two metal terminals 30 are arranged facing each other, the first and the second chip capacitors 20, 80 are set between two metal terminals 30, and then, the first and the second terminal electrodes 22, 82 of the first and the second chip capacitors 20, 80 are connected to electrode connecting component 32 of metal terminal 30. According to the present embodiment, after setting the first and the second chip capacitors 20, 80 between metal terminals 30, a solder as connecting member 50 is applied along side 32bc of the second component 32b in metal terminal 30 shown in FIG. 2. In case of using a solder paste, said solder paste is further molten and solidified. Then, electrode connecting component 32 is connected to the first and the second terminal electrodes 22, 82.

Note, metal terminal 30 may be connected to the first and the second chip capacitors 20, 80, in a state in which a plural number of metal terminals 30 composing the other ceramic capacitor 10 are connected after manufacturing. In this case, metal terminals 30 in connected state are cut into individual pieces after connected to the first and the second chip capacitors 20, 80. Further, before setting the first and the second chip capacitors 20, 80 to metal terminal 30, connecting member 50, connecting the first and the second chip capacitors 20, 80 and metal terminal 30, may be applied to electrode connecting component 32.

As shown in FIG. 4, according to ceramic capacitor 10, second component 32b of electrode connecting component 32 is disposed to straddle the first terminal electrode 22 and the second terminal electrode 82. Length W2 of the second component 32b in a width direction is shorter than lengths W3, W4 of the first chip capacitor 20 and of the second chip capacitor 80 in a width direction. Thus, according to ceramic capacitor 10, the second component 32b is connected to the first terminal electrode 22 and the second terminal electrode 82 near the boundary between the first terminal electrode 22 and the second terminal electrode 82. Thus, metal terminal 30 as the external terminal and the plural number of the chip components 20, 80 are capable to be accurately and precisely connected.

According to ceramic capacitor 10, even when connecting member 50 is applied after setting the first and the second chip capacitors 20, 80 to metal terminal 30, connecting member 50 is easy to flow into a gap between the second component 32b and the first and the second terminal electrodes 82. Thus, metal terminal 30 and the first and the second chip capacitors 20, 80 can be reliably connected, and the connecting part shows a good mechanical strength. In addition, the connecting part state between metal terminal 30 and the first and the second terminal electrodes 22, 82 can be easily and visually recognized from outer part. Thus, confirmation of the connecting state, detection of defective products due to the connecting state, and etc. are easy.

Further, according to ceramic capacitor 10, length W2 of the second component 32b in a width direction is shorter than the length W1 of the first component 32a in a width direction. Therefore, connecting member 50, such as a solder, to flow downward and overly spread when molten can be properly prevented. Therefore, ceramic capacitor 10 prevents the spread of connecting member 50 toward coupling component 36 or connecting component for mounting 34, the mechanical strength of the connecting part is properly ensured, and the deterioration in the occurrence of noise due to a damage in flexibility of such as coupling component 36 can be prevented.

The Second Embodiment

Figure 6:
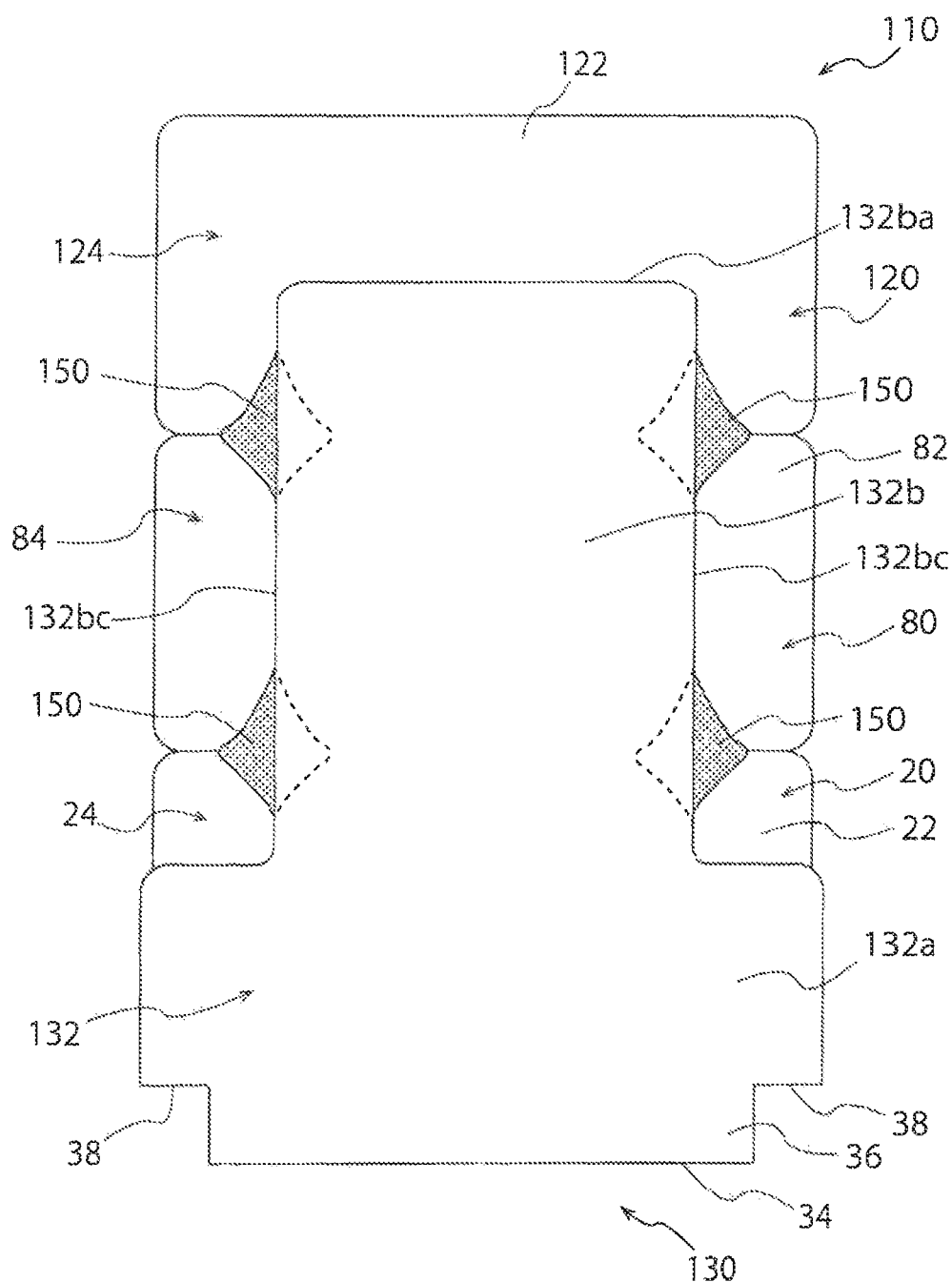
FIG. 6 is a side view of the electronic device according to the second embodiment of the invention.

FIG. 6 is a side view of ceramic capacitor 110 as an electronic device according to the second embodiment of the invention. Ceramic capacitor 110 is similar to ceramic capacitor 10 according to the first embodiment of the invention, except ceramic capacitor 110 includes the third chip capacitor 120 in addition to the first and the second chip capacitors 20, 80, and the shape of the second component 132b of metal terminal 130 is different. Thus, only the different part of ceramic capacitor 110 relative to ceramic capacitor 10 is described, and the same numeral is used for the common parts, and the overlapped explanation thereof is omitted.

The third chip capacitor 120 has the same shape with the first and the second chip capacitors 20, 80, and arranged on the second chip capacitor 80. The third terminal electrode 122 is formed at both end faces 124 of the third chip capacitor 120. As shown in FIG. 6, the third terminal electrode 122 of the third chip capacitor 120 is arranged on the same plane as the first and the second terminal electrodes 22, 82 of the first and the second chip capacitors 20, 80.

Ceramic capacitor 110 includes a pair of metal terminals 130 attached to both end faces of the first to the third chip capacitors 20, 80, 120, each. One metal terminal 130 is electrically connected to one of the first terminal electrode 22 of the first chip capacitor 20, one of the second terminal electrode 82 of the second chip capacitor 80, and one of the third terminal electrode 122 of the third chip capacitor 120. The other metal terminal 130 in Y-axis negative direction is electrically connected to the other first to the third terminal electrodes 22, 82, 122 of the first to the third chip capacitors 20, 80, 120, respectively.

Metal terminal 130 includes electrode connecting component 132, coupling component 36, connecting component for mounting 34, and support component 38. Coupling component 36, connecting component for mounting 34, and support component 38 are similar to metal terminal 30 according to the first embodiment. Electrode connecting component 132 includes the first component 132a and the second component 132b. The first component 132a is similar to the first component 32a of electrode connecting component 32 according to the first embodiment.

The second component 132b of electrode connecting component 132 shown in FIG. 6 extends upward from the first component 132a, and faces three terminal electrodes including the first terminal electrode 22, the second terminal electrode 82 and the third terminal electrode 122. Electrode connecting component 132 has an upside down T-shape, similar to electrode connecting component 32 shown in FIG. 4.

Electrode connecting component 132 of metal terminal 130 is connected to the first to the third terminal electrodes 22, 82, 122 of the first to the third chip capacitors 20, 80, 120 by conductive connecting member 150. Solder, conductive adhesive agent, and etc. are exemplified as connecting member 150; however, it is not particularly limited.

Connecting member 150 is provided in the periphery of side 132bc, particularly along side 132bc, corresponding to an edge part of the second component 132b in a width direction. As shown in FIG. 6, side 132bc of the second component 132b is disposed to straddle from the first to the third terminal electrodes 22, 82, 122. Therefore, by setting connecting member 150 along side 132bc, electrode connecting component 132 can be reliably connected to all the chip components, including the first to the third chip capacitors 20, 80, 120. In addition, when connecting member 150 forms bridge between side 132bc and the first to the third terminal electrodes 22, 82, 122, a connecting reliability between electrode connecting component 132 and the first to the third chip capacitors 20, 80, 120 can be enhanced.

As shown in FIG. 6, connecting member 150 flows into a gap between the first and the second terminal electrodes 22, 82 and the second component 132b and a gap between the second and the third terminal electrodes 82, 122 and the second component 132b. Thus, electrode connecting component 132 and the first to the third chip capacitors 20, 80, 120 can be reliably connected. Therefore, ceramic capacitor 110 can suppress fluctuations of the position and the range where connecting member 150 is set, and fluctuations of the mechanical strength and electrical characteristic due to fluctuations of the connecting state can be made small. In addition, ceramic capacitor 110 exerts the similar effects as ceramic capacitor 10 of the first embodiment.

The Third Embodiment

Figure 7:
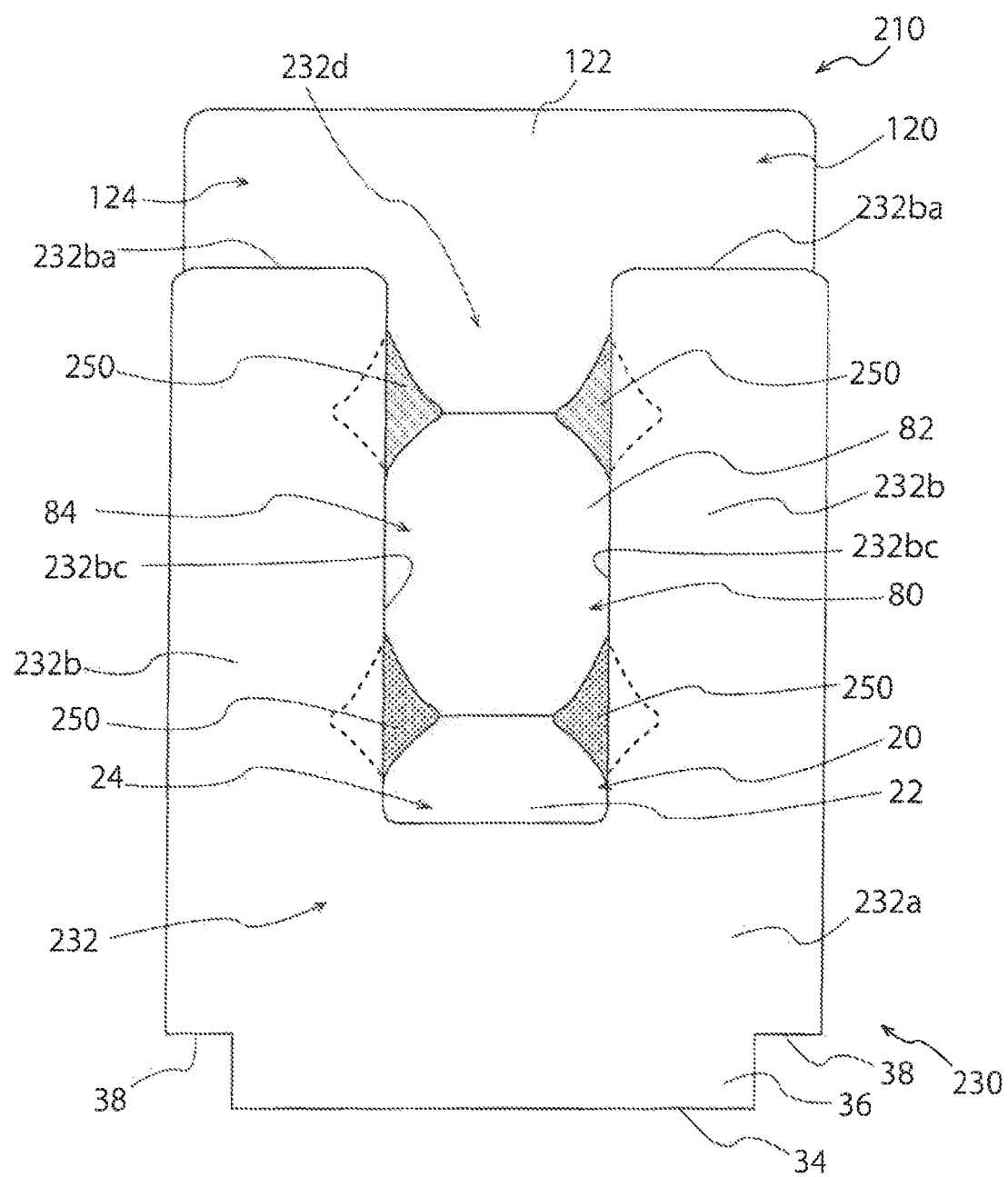
FIG. 7 is a side view of the electronic device according to the third embodiment of the invention.

FIG. 7 is a side view of ceramic capacitor 210 as an electronic device according to the third embodiment of the invention. Ceramic capacitor 210 is similar to ceramic capacitor 110 according to the second embodiment of the invention, except the shape of the second component 232b of metal terminal 230 is different. Thus, only the different part of ceramic capacitor 210 relative to ceramic capacitor 110 is described, and the same numeral is used for the common parts, and the overlapped explanation thereof is omitted.

Ceramic capacitor 210 includes a pair of metal terminals 230 attached to both end faces of the first to the third chip capacitors 20, 80, 120, each. One metal terminal 230 is electrically connected to one of the first terminal electrode 22 of the first chip capacitor 20, one of the second terminal electrode 82 of the second chip capacitor 80, and one of the third terminal electrode 122 of the third chip capacitor 120. The other metal terminal 230 in Y-axis negative direction is electrically connected to the other first to the third terminal electrodes 22, 82, 122 of the first to the third chip capacitors 20, 80, 120, respectively.

Metal terminal 230 includes electrode connecting component 232, coupling component 36, connecting component for mounting 34, and support component 38. Coupling component 36, connecting component for mounting 34, and support component 38 are similar to metal terminal 130 according to the second embodiment. Electrode connecting component 232 includes the first component 132a and the second component 132b. The first component 232a is similar to the first component 132a according to the second embodiment.

Electrode connecting component 232 shown in FIG. 7 includes two second components 232b extending upward from the first component 232a. The second component 232b faces three terminal electrodes including the first terminal electrode 22, the second terminal electrode 82 and the third terminal electrode 122. The two second components 232b are respectively connected to both ends of the first component 232a in a width direction. Grove 232d is formed between the two second components 232b, and the first terminal electrode 22, the second terminal electrode 82 and the third terminal electrode 122 are partly exposed from groove 232d. Electrode connecting component 232 has U-shape.

Electrode connecting component 232 of metal terminal 230 is connected to the first to the third terminal electrodes 22, 82, 122 of the first to the third chip capacitors 20, 80, 120 by conductive connecting member 250. Solder, conductive adhesive agent, and etc. are exemplified as connecting member 250; however, it is not particularly limited.

Connecting member 250 is provided in the periphery of central side 232bc, particularly along central side 232bc at a center side of the edge part of the second component 232b in a width direction. As shown in FIG. 7, central side 232bc of the second component 232b is disposed to straddle from the first to the third terminal electrodes 22, 82, 122. Therefore, by setting connecting member 250 along central side 232bc, electrode connecting component 232 can be reliably connected to all the chip components, including the first to the third chip capacitors 20, 80, 120. In addition, when connecting member 250 forms bridge between central side 232bc and the first to the third terminal electrodes 22, 82, 122, a connecting reliability between electrode connecting component 232 and the first to the third chip capacitors 20, 80, 120 can be enhanced.

As shown in FIG. 7, connecting member 250 flows into a gap between the first and the second terminal electrodes 22, 82 and the second component 232b and a gap between the second and the third terminal electrodes 82, 122 and the second component 232b. Thus, electrode connecting component 232 and the first to the third chip capacitors 20, 80, 120 can be reliably connected. Therefore, ceramic capacitor 210 can suppress fluctuations of the position and the range where connecting member 250 is set, and fluctuations of the mechanical strength and electrical characteristic due to fluctuations of the connecting state can be made small. In addition, ceramic capacitor 210 exerts the similar effects as ceramic capacitor 110 of the second embodiment.

The Fourth Embodiment

Figure 8:
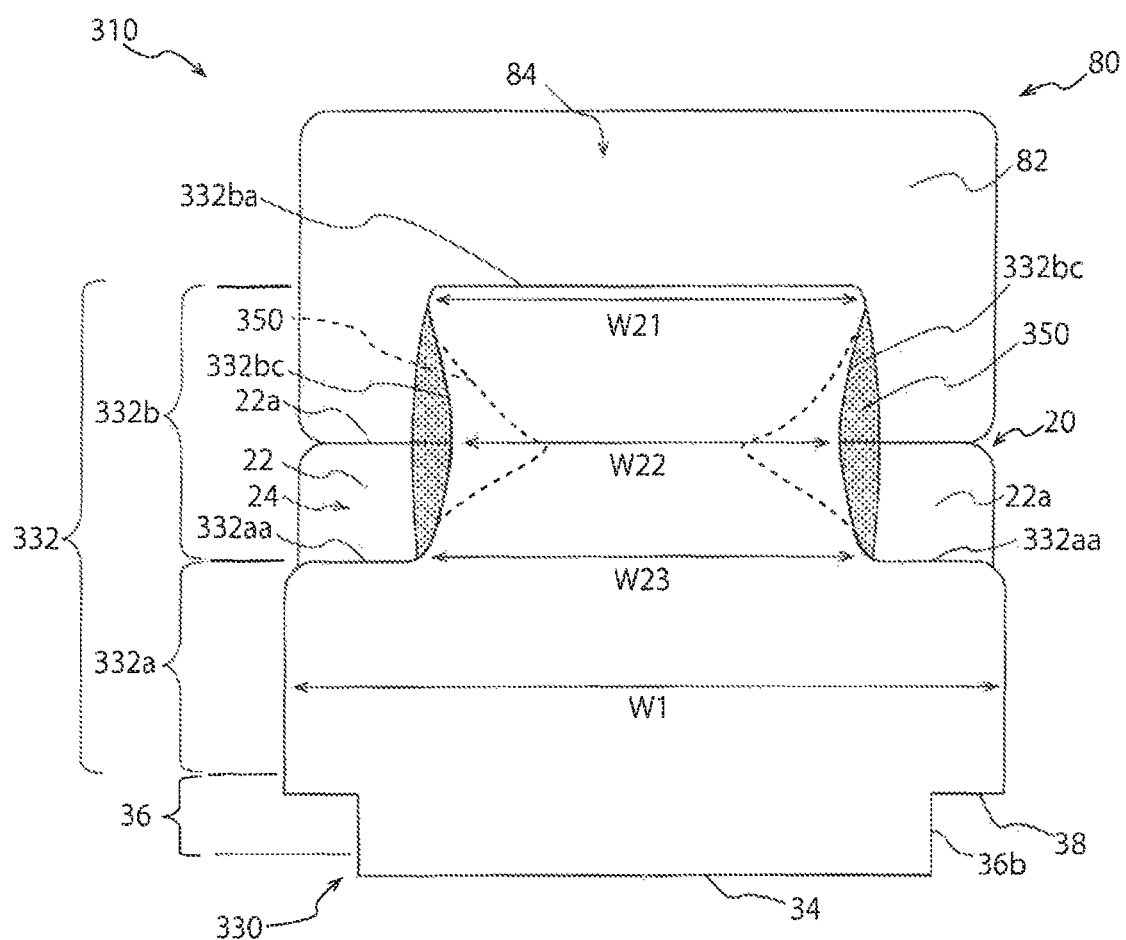
FIG. 8 is a side view of the electronic device according to the fourth embodiment of the invention.

FIG. 8 is a side view of ceramic capacitor 310 as an electronic device according to the fourth embodiment of the invention. Ceramic capacitor 310 is similar to ceramic capacitor 10 according to the first embodiment of the invention, except the shape of the second component 332b of metal terminal 330 is different. Thus, only the different part of ceramic capacitor 310 relative to ceramic capacitor 10 is described, and the same numeral is used for the common parts, and the overlapped explanation thereof is omitted.

Ceramic capacitor 310 includes a pair of metal terminals 330 attached to both end faces of the first and the second chip capacitors 20, 80. One metal terminal 330 is electrically connected to one first terminal electrode 22 of the first chip capacitor 20 and one second terminal electrode 82 of the second chip capacitor 80. The other metal terminal 330 in Y-axis negative direction is electrically connected to the other first and the second terminal electrodes 22, 82 of the first and the second chip capacitors 20, 80.

Metal terminal 330 includes electrode connecting component 332, coupling component 36, connecting component for mounting 34, and support component 38. Coupling component 36, connecting component for mounting 34, and support component 38 are similar to metal terminal 30 according to the first embodiment. Electrode connecting component 332 includes the first component 332a and the second component 332b. The first component 332a is similar to the first component 32a of connecting component 32 according to the first embodiment.

Electrode connecting component 332 shown in FIG. 8 extends upward from the first component 332a and faces both the first terminal electrode 22 and the second terminal electrode 82. Side 332bc, corresponding to both ends of the second component 332b in a width direction, has a curve shape in which a center part in a height direction is recessed to the center part side in a width direction, which differs from side 32bc of the second component 32b according to the first embodiment (See FIG. 4).

Therefore, the length of the second component 332b in a width direction is varied by a position of the second component in a height direction. Said length is shorter at the center part in a height, relative to the length at the upper end and the lower end of the second component 332b. Namely, length W22 in a width direction at the center part of the second component 332b (the same height with the first terminal electrode upper end 22a, which is an upper end of the first terminal electrode 22) is longer than length W21 in a width direction at the second component upper end 332ba, which is an upper end of the second component 332b, and is also longer than length W23 in a width direction at the lower end part of the second component 332b.

Electrode connecting component 332 of metal terminal 330 is connected to the first and the second terminal electrodes 22, 82 of the first and the second chip capacitors 20, 80 by conductive connecting member 350. Solder, conductive adhesive agent, and etc. are exemplified as connecting member 350; however, it is not particularly limited. Connecting member 350 is provided in the periphery of side 332bc of the second component 332b. As shown in FIG. 8, side 332bc of the second component 332b is disposed to straddle from the first and the second terminal electrodes 22, 82. Therefore, by setting connecting member 350 along side 332bc, electrode connecting component 332 can be reliably connected to both the first and the second chip capacitors 20, 80. In addition, when connecting member 350 forms bridge between side 332bc and the first and the second terminal electrodes 22, 82, a connecting reliability between electrode connecting component 332 and the first and the second chip capacitors 20, 80 can be enhanced.

Side 332bc of the second component 332b is lengthened by the curved shape of side 332bc of the second component 332b, and that the connecting strength between electrode connecting component 332 and the first and the second terminal electrodes 22, 82 is enhanced. Further, the connecting material 350, such as the solder, is likely to stay near the center part of the second component 332b in a height direction. Thus, fluctuations in a spreading method of the connecting material 350 can be prevented, and fluctuations of the connecting strength due to the connecting member 350 can be suppressed. Ceramic capacitor 310 shows the same effect as ceramic capacitor 10 according to the first embodiment.

The Other Embodiment

Note, the invention is not limited to the embodiments described above and the invention can be varied in various modes within a range of the invention. For instance, support component 38 of the metal terminal 30, 130, 330 may not be formed; however, formation of support component 38 enables to ensure the hold of chip capacitors 20, 80, 120, and the solder bridge is hardly formed.

A shape of the second component 32b, 132b, 332b included in electrode connecting component 32, 132, 332 of metal terminal 30, 130, 330 is not limited to the square shape having roundness at angular parts as shown in figures of the embodiments, and it can be a semicircle shape, an U-shape, a semi-ellipsoid shape, a triangle shape, the other polygonal shape, and etc.

NUMERICAL REFERENCES 10, 110, 210 . . . ceramic capacitor
20, 80, 120 . . . chip capacitor
21 . . . R-shape
22, 82, 122 . . . terminal electrode
22a . . . the first terminal electrode upper end
24, 84, 124 . . . end face
26 . . . side face
26a . . . front side face
26b . . . upper side face
26d . . . lower side face
30, 130 230 . . . metal terminal
32, 132, 232 . . . electrode connecting component
32a . . . the first component
32aa . . . the first component upper end
32b, 132b, 232b . . . the second component
32ba . . . the second component upper end
32bc, 132bc . . . side
34 . . . the connecting component for mounting
36 . . . coupling component
38 . . . support component
50, 150, 250 . . . connecting member

The invention claimed is:

1. An electronic device comprising:
a first chip having an approximately rectangular parallelepiped shape and a first terminal electrode at an end face thereof;
a second chip having an approximately rectangular parallelepiped shape and a second terminal electrode at an end face thereof, the second chip being stacked on the first chip; and
an external terminal electrically connected to the first terminal electrode and the second terminal electrode, the external terminal comprising:
a coupler;
a mounting connector connected to a lower end of the coupler and extending in a direction approximately vertical to the coupler; and
an electrode connector connected to the first terminal electrode and the second terminal electrode, the coupler projecting from a lower side of the electrode connector and directly connecting to the first terminal electrode, the lower side of the electrode connector being positioned at a same height as a lower end of the first terminal electrode, the electrode connector comprising:
a first component connected to the coupler and facing the first terminal electrode; and
a second component extending upward from the first component and facing the first terminal electrode and the second terminal electrode,
wherein an upper end of the second component is an upper end of the external terminal,
a maximum width W2 of the second component in a direction parallel to the end face and a lower face of the first chip is shorter than a maximum width W1 of the first component in the direction parallel to the end face and the lower face of the first chip, and
the maximum width W2 of the second component is shorter than maximum widths W3 and W4 of the first chip and the second chip, respectively.

2. The electronic device according to claim 1, wherein the width W1 is larger than the widths W3 and W4.

3. The electronic device according to claim 1, wherein an upper end of the second component is arranged lower than an upper end of the second terminal electrode.

4. The electronic device according to claim 1, wherein a ratio T5/T3 is 0.10 to 0.60, when
T5 is a vertical length from an upper end of the first component to an upper end of the first terminal electrode, and
T3 is a vertical length of the first chip.

5. The electronic device according to claim 1, wherein a solder adhesion prevention area is formed on an inner face of the coupler facing a first chip side, and
the solder adhesion prevention area has poor wettability with a solder relative to an outer face of the coupler that faces a direction opposite the inner face of the coupler.

6. The electronic device according to claim 1, further comprising:
a support supporting the first chip from an underside and being connected to a lower end of the electrode connector, the support extending approximately vertical to the electrode connector toward a first chip side.

7. The electronic device according to claim 6, wherein a length from an end of the support to the electrode connector is longer than an equivalent dimension of a curvature radius of "R" shape formed on a corner of the first chip.

8. The electronic device according to claim 1, wherein the width W2 is varied according to a position of the second component in a height direction, and
the width W2 at a center part of the second component in the height direction is shorter than an equivalent dimension at the upper end and a lower end of the second component in the height direction.

9. An electronic device comprising:
a first chip having an approximately rectangular parallelepiped shape and a first terminal electrode at an end face thereof;
a second chip having an approximately rectangular parallelepiped shape and a second terminal electrode at an end face thereof, the second chip being stacked on the first chip;
an external terminal electrically connected to the first terminal electrode and the second terminal electrode, and the external terminal comprising:
a coupler;

a mounting connector connected to a lower end of the coupler;

a electrode connector connected to the first terminal electrode and the second terminal electrode, the coupler projecting from a lower side of the electrode connector, the electrode connector comprising:

a first component connected to the coupler and facing the first terminal electrode; and a second component extending upward from the first component and facing the first terminal electrode and the second terminal electrode; and a support supporting the first chip from an underside and being connected to a lower end of the electrode connector, the support extending approximately vertical to the electrode connector toward a first chip side, wherein a width W2 of the second component in a direction parallel to the end face and a lower face of the first chip is shorter than a width W1 of the first component in the direction parallel to the end face and the lower face of the first chip, the width W2 of the second component is shorter than widths W3 and W4 of the first chip and the second chip, respectively, and a length from an end of the support to the electrode connector is longer than an equivalent dimension of a curvature radius of "R" shape formed on a corner of the first chip.

10. An electronic device comprising:

a first chip having an approximately rectangular parallelepiped shape and a first terminal electrode at an end face thereof;

a second chip having an approximately rectangular parallelepiped shape and a second terminal electrode at an end face thereof, the second chip being stacked on the first chip;

an external terminal electrically connected to the first terminal electrode and the second terminal electrode, and the external terminal comprising:

a coupler;

a mounting connector connected to a lower end of the coupler; and a electrode connector connected to the first terminal electrode and the second terminal electrode, the coupler projecting from a lower side of the electrode connector, the electrode connector comprising:

a first component connected to the coupler and facing the first terminal electrode;

a second component extending upward from the first component and facing the first terminal electrode and the second terminal electrode, wherein a width W2 of the second component in a direction parallel to the end face and a lower face of the first chip is shorter than a width W1 of the first component in the direction parallel to the end face and the lower face of the first chip, the width W2 of the second component is shorter than widths W3 and W4 of the first chip and the second chip, respectively, the width W2 is varied according to a position of the second component in a height direction, and the width W2 at a corner part of the second component in the height direction is shorter than an equivalent dimension at the upper end and a lower end of the second component in the height direction.

11. An electronic device comprising:

a first chip having an approximately rectangular parallelepiped shape and a first terminal electrode at an end face thereof;

a second chip having an approximately rectangular parallelepiped shape and a second terminal electrode at an end face thereof, the second chip being stacked on the first chip; and an external terminal electrically connected to the first terminal electrode and the second terminal electrode, the external terminal comprising:

a coupler;

a mounting connector connected to a lower end of the coupler and extending in a direction approximately vertical to the coupler; and an electrode connector connected to the first terminal electrode and the second terminal electrode; the coupler projecting from a lower side of the electrode connector; the lower side of the electrode connector being positioned at a same height as a lower end of the first terminal electrode, the electrode connector comprising:

a first component connected to the coupler and facing the first terminal electrode;

a second component extending upward from the first component and facing the first terminal electrode and the second terminal electrode, wherein an upper end of the second component is an upper end of the external terminal, a maximum width W2 of the second component in a direction parallel to the end face and a lower face of the first chip is shorter than a maximum width of the first component in a direction parallel to the end face and the lower face of the first chip, the second component extends from the center of the first component in a direction parallel to the end face and a lower face of the first chip, and the maximum width W2 of the second component is shorter than maximum widths W3 and W4 of the first chip and the second chip, respectively.

* * * * *